Sept. 7, 1948.                C. F. P. ROSE                 2,448,623
                  DUPLEX SWITCH WITH LEAKAGE COMPENSATION
Filed Feb. 15, 1945                                  2 Sheets-Sheet 1
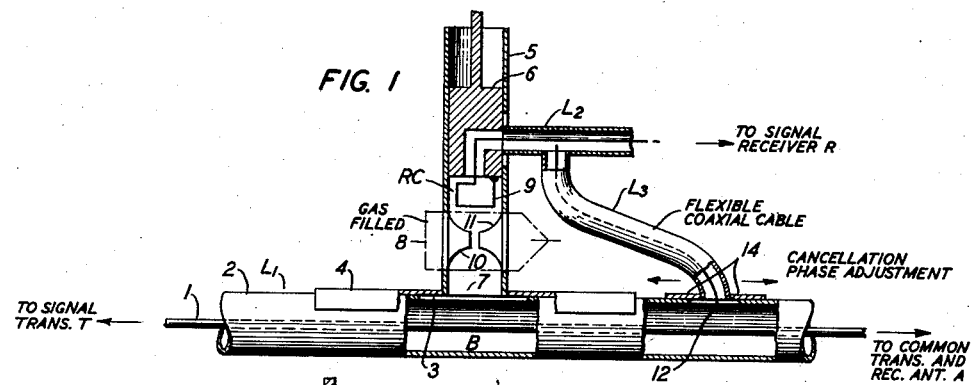
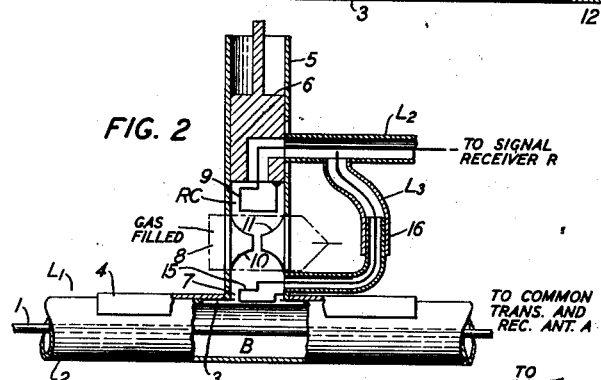
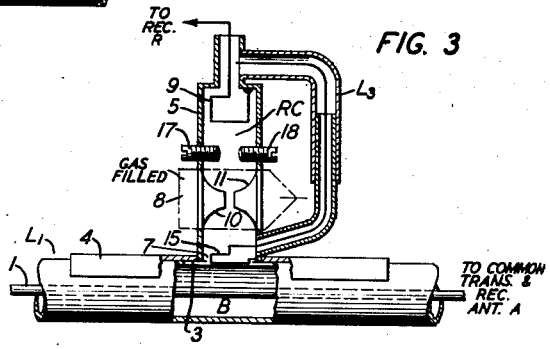
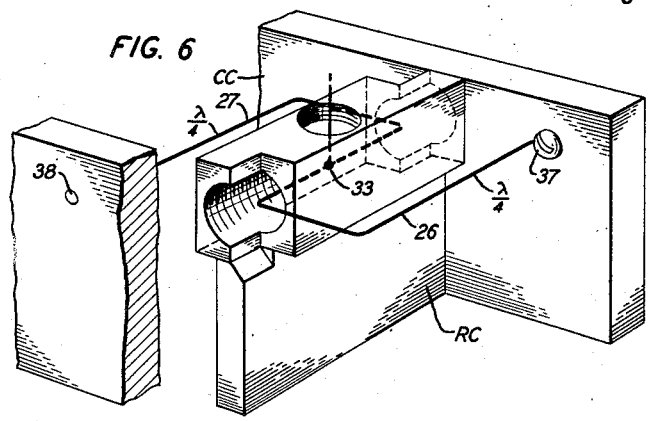
INVENTOR
C. F. P. ROSE
BY
Earl C. Laughlin
ATTORNEY

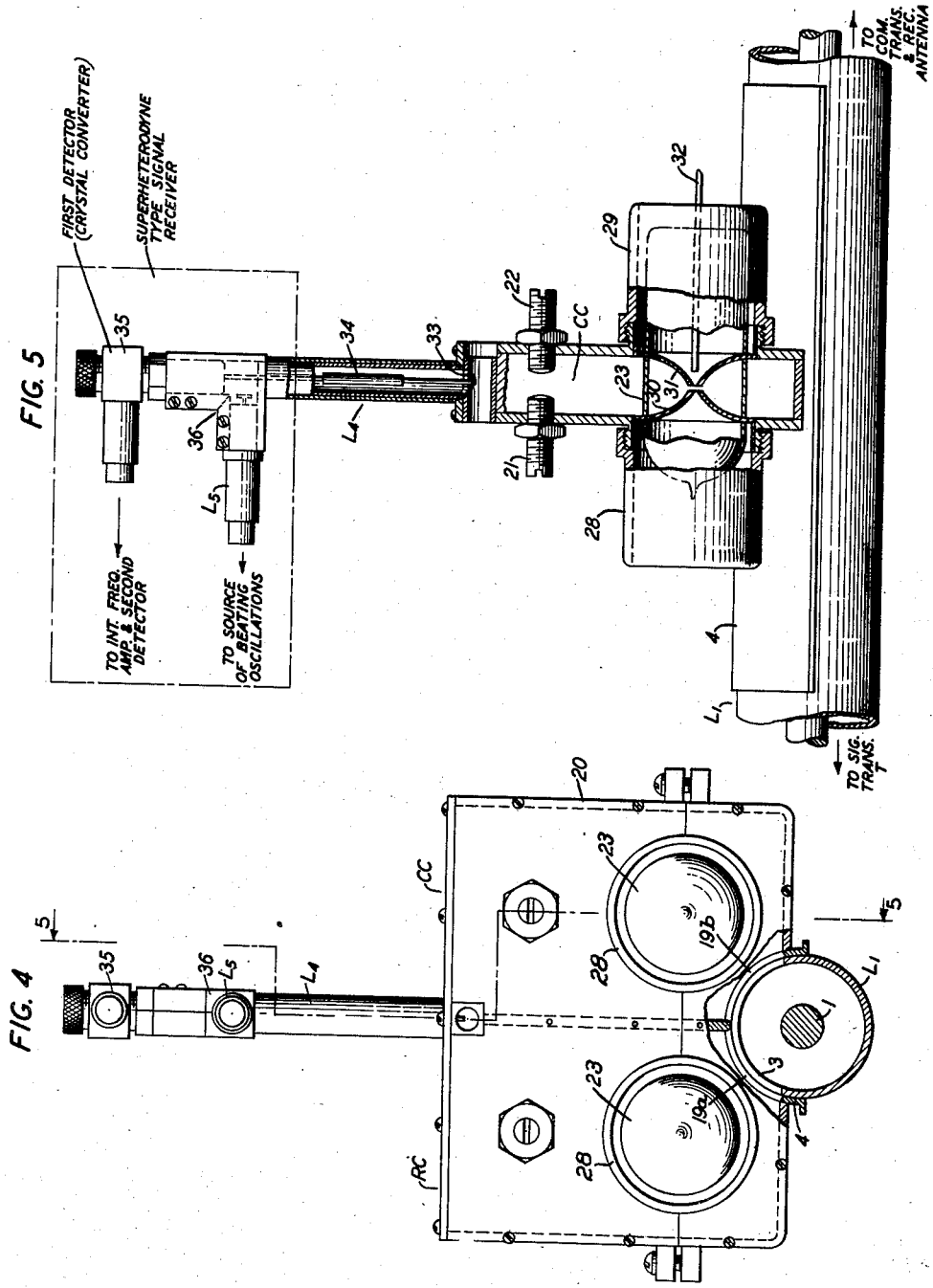

Patented Sept. 7, 1948

2,448,623

UNITED STATES PATENT OFFICE 2,448,623

DUPLEX SWITCH WITH LEAKAGE COMPENSATION

Charles F. P. Rose, Asbury Park, N. J., assignor to Bell Telephone Laboratories, Incorporated, New York, N. Y., a corporation of New York Application February 15, 1945, Serial No. 578,073

11 Claims. (Cl. 178—44)

The invention relates to a two-way signal transmission system, and particularly to coupling and switching arrangements for use at a terminal of such a system to enable proper two-way operation where the signal transmitting and receiving circuits are coupled to a two-way signal transmission medium through a common transmission device, such as an antenna.

Although the coupling and switching arrangements of the invention are applicable to any wire or radio signal transmission system of the duplex type, they are particularly adapted for and will be described as applied to an object-locating system of the pulse reflection type, for example, one employing ultra-high frequency or radio waves, commonly called a radar system. In the usual radar system, very short pulses of high frequency signal energy are generated and radiated at frequent intervals through an antenna at an observation point into a surrounding air wave transmission medium; return pulses, which may be termed radio echoes, reflected from objects to be located in the transmission medium are picked up by the same antenna and are detected in an associated tuned signal receiver; and the detected pulses are compared on a time basis in a suitable measuring or indicating circuit with the outgoing signal pulses so as to provide a measure of the distances to the objects causing the echoes.

Usually such systems employ extremely sensitive apparatus, such as tube or crystal detectors, in their receiving circuits, which may be destroyed or have their operation characteristics substantially impaired if subjected to very high voltages such as would necessarily be used for the outgoing signal wave energy. To provide proper duplex operation and prevent injury to the sensitive receiving apparatus, signal controlled switching devices have been used with such systems to insert a suitable loss in the input to the receiver during signal transmitting intervals and to remove that loss during signal receiving intervals. In one such system of the prior art disclosed in the copending United States patent application of A. L. Samuel, Serial No. 474,122, filed January 30, 1943, a coaxial or wave guide line is employed for connecting the signal transmitter or outgoing signal pulse generator to the antenna or other common signal transmitting and receiving device, and the signal controlled switching device employed for the above purpose comprises a hollow chamber or cavity with walls of conductive material, suitably dimensioned and designed so as to be resonant to the frequency of the incoming and outgoing signals, with a gaseous discharge tube connected across it, coupling the input of the signal receiver to the main line at a suitably located branching point. The gas tube is adapted to discharge in response to the high resonant voltage built up across it by the portions of the outgoing signal pulse energy entering the resonant chamber during signal transmitting intervals, so as to provide a low impedance shunt across the chamber operating to detune the latter and thus to appreciably reduce the amount of this signaling energy reaching the signal receiver, and to remain in the undischarged condition to maintain the resonant chamber tuned and thus the transmission efficiency of the receiving circuit high for the relatively low voltage incoming signal pulse energy entering the resonant chamber during signal receiving intervals.

An object of the invention is to improve a coupling and switching device of the above-described type, particularly from the standpoint of reducing the amount of high power leakage through the device to the local receiver during signal transmitting intervals.

A more specific object is to so reduce high power leakage through a signal controlled switching device of the resonant chamber-gas discharge tube type in a radar system or terminal of a duplex signal wave transmission system, as to prevent injury or substantial impairment of operation of associated sensitive signal receiving apparatus, such as crystal detectors, and without adversely affecting its operation for low power signal inputs.

These objects are attained in accordance with the invention by the addition to a system of the above-described type, of an arrangement for abstracting sample energy portions of the signal waves or pulses transmitted over the main line connecting the outgoing signal wave generator to the antenna or other common transmitting and receiving device; for transmitting these sample signal energy portions over an auxiliary transmission path towards the output of the resonant chamber of the transmit-receive switching device and for there combining the signal output of the latter path with the signal output of the resonant chamber in proper phase and magnitude so as to effectively cancel the high power leakage through the device; and for making the attenuation of the auxiliary path equal to that afforded by the resonant chamber when it is detuned through the function of the associated shunting gas discharge device, so as to avoid cancellation of the incoming signal energy during signal receiving intervals.

In one embodiment of the invention, the duplexing or transmit-receive switching device comprises adjacent twin "double mode" cavities or chambers each with an associated shunting discharge device, excited from a common point on the main transmission line and having their outputs connected in opposing phase relation so that the voltage output of one chamber normally detuned from the signal frequency may be made to cancel the high power signal leakage through the other chamber normally resonant to the signal frequency when the latter is detuned by the discharge of the associated discharge device in response to the portion of high power outgoing signal energy entering that chamber during signal transmitting intervals. The normally detuned condition of the cancellation chamber is utilized to prevent it from causing suppression of the low level incoming signal energy transmitted through the other normally tuned chamber to the local receiver during signal receiving intervals.

The various objects and features of the invention will be better understood from the following detailed description when read in conjunction with the accompanying drawings in which:

Each of Figs. 1 to 3, inclusive, shows schematically a portion of a radar system employing coupling and switching arrangements shown partly in section, embodying the invention, the arrangements of these figures differing only in structural details;

Figs. 4 and 5 show a front elevation view and a sectional view, respectively, of a switch assembly illustrating one practical embodiment of the invention; and Fig. 6 shows a perspective view, partly broken away, of a portion of the coupling and switching arrangement of Figs. 4 and 5, illustrating diagrammatically the means employed for providing the required 180-degree phase difference between the outputs of the two resonant chambers.

In the radar systems of Figs. 1 and 2, a main line $L_1$ comprising a section of coaxial line having inner and outer concentric conductors 1 and 2, respectively, connects the signal transmitter T to the common transmitting and receiving antenna A. The signal transmitter T may be of the magnetron type, adapted to generate recurring electric signal pulses of ultra-high frequency, such as disclosed, for example, in the United States patent of A. L. Samuel 2,063,342, issued December 8, 1936. A longitudinal slot 3 is cut in the outer conductor 2 of the main coaxial line $L_1$ at a suitably located branching point B intermediate the transmitter T and the antenna A. A sector of pipe 4 having a small aperture or window cut in it at a mid-point is adapted to slide over the portion of the outer conductor 2 of line $L_1$ containing the longitudinal slot 3.

A section of hollow metal wave guide 5, which may be of rectangular or circular cross-section, is mounted on the face of the pipe sector 4 at a point adjacent the aperture therein, so that its longitudinal axis is perpendicular to the longitudinal axis of the main line $L_1$. The wave guide section 5 is closed at its far end with a piston or plunger 6. The interior of the wave guide section 5 is connected at its near end through a small window or iris 7 formed by the intermediate aperture in the pipe sector 4 and the adjacent portion of the longitudinal slot 3 in the outer conductor 2 of the coaxial line $L_1$, with the interior of that line.

The interior portion of the wave guide 5 between the iris 7 and the piston 6 forms a hollow chamber or cavity RC, the dimensions of this chamber and the size of the iris 7 being selected so that the chamber is resonant at the frequency of the outgoing signals generated by the signal transmitter T and of the incoming signals received over the line $L_1$ from the antenna A. The tuning of the resonant chamber RC may be changed within given limits by adjustment of the the position of the plunger 6 in the wave guide 5 so as to change the effective length of the chamber, thus adapting it for changes in the frequency of the incoming and outgoing signals. A metal loop 9 in the chamber RC near its far end connects through apertures in one side of the wave guide 5 to the inner and outer conductors of a second coaxial line $L_2$ which extends through to a suitable signal receiver R. The loop 9 provides coupling at the frequency to which the chamber RC is tuned, for transmission to the signal receiver. A pair of spark-gap electrodes 10 and 11 are connected to opposite sides of the resonant chamber RC at a high impedance point (near the electrical center of the chamber), to provide a discharge gap between them adapted to be broken down to short-circuit the chamber when a sufficiently high resonant voltage is built up across the gap. As indicated diagrammatically, the electrodes 10 and 11 may be enclosed in a suitable vessel or tube 8 containing an atmosphere of gas at low pressure, so that the spark-gap may be easily broken down by the high voltages which would necessarily be used for the outgoing signals in such a system.

In the usual operation of the system of Figs. 1 and 2 as described, the energy of the high frequency pulses from the transmitting pulse generator T during signal transmitting periods flows over the main coaxial line $L_1$ toward the antenna A. Part of that wave energy will be transmitted to and radiated by the antenna A to the associated wave transmission medium, and another portion will be diverted from the line $L_1$ at the branching point B through the iris coupling 7 into the input of the resonant chamber RC and will build up across the gap between the spark-gap electrodes 10 and 11 a sufficiently high voltage to cause an arc discharge in the gap between those electrodes. The effect of this is to produce a low impedance shunt across the chamber RC at a maximum impedance point and thus a lower apparent impedance across the input of that chamber. The effective short-circuit thus produced at the coupling iris 7 will detune the chamber RC so as to substantially reduce the amount of pulse energy of the resonant frequency transmitted through the chamber and thus the amount of high power signal energy passing to the signal receiver R by way of the output loop 9 and associated coaxial line $L_2$. The relatively low resonant voltage of the portion of each incoming signal pulse received during signal receiving periods over the coaxial line $L_1$ from the antenna A, which is diverted into the input of the resonant chamber RC through the coupling iris 7, will be insufficient to cause the spark-gap between the electrodes 10 and 11 to break down, so that there will be no short-circuit produced across the resonant chamber RC. That chamber, therefore, will be maintained tuned to the signal frequency so as to allow transmission of the received signal pulses through the resonant chamber and the coaxial line $L_2$ to the signal receiver R with comparatively little loss. By proper adjustment of the pipe sector 4 along the outer conductor 2 of the coaxial line $L_1$, the length of line between the signal transmitter T and the input iris 7 of the resonant chamber 8 (branching point B), may be made such that substantially all of the received incoming signal energy may be diverted from the coaxial line $L_1$ into the resonant chamber RC.

By mounting the output loop 9 on the face of the tuning plunger 6, as indicated, and rotating this loop so that its plane is at an optimum angular position with respect to the face of the plunger, the amount of high power leakage through the chamber during signal transmitting periods may be made independent of the tuning frequency used over a given frequency range.

In systems of the above-described type in which crystal detectors are employed in the signal receiver, the high power leakage through the resonant chamber of such a transmit-receive switch may be high enough to destroy or substantially impair the operation of the crystal detectors. This is prevented in accordance with the present invention by the addition of suitable auxiliary arrangements for abstracting energy samples of the outgoing signals applied to the input of the resonant chamber during signal transmitting intervals, for transmitting these samples over an auxiliary transmission path of suitable characteristics towards the output of the resonant chamber and for there combining the signal output of the auxiliary path with the signal output of that chamber in proper phase and magnitude to effectively cancel out the high power leakage component through the chamber during signal transmitting intervals.

In one arrangement for accomplishing this, illustrated schematically in Fig. 1 the cancellation voltage is introduced through a length of flexible coaxial cable $L_3$ which connects a voltage probe 12 extending into the interior of the main coaxial line $L_1$ at a suitable distance longitudinally from the branching point B, to a T junction with a lead from the output loop 9 of the resonant chamber RC. Preferably, the end of the flexible coaxial cable $L_3$ is capacitively coupled with the output lead at this point, as indicated, so as to segregate the cancellation path from the output path of the resonant chamber RC and to provide a desired amount of insertion loss to the low level incoming signals and to prevent the introduction of additional low level loss in the latter path. This capacity coupling is also used to supply a portion of the necessary attenuation in the cancellation path required so as to prevent the latter from causing cancellation of the low level incoming signals diverted from the main line $L_1$ into the resonant chamber RC during signal receiving intervals, when that chamber is tuned to transmit these signals efficiently. The total attenuation provided by the cancellation path including cable $L_3$ and its associated couplings should be equal to the attenuation afforded by the resonant chamber RC when it is detuned by a breakdown of the associated discharge gap between electrodes 10 and 11 in response to the high level outgoing signals. The necessary 180-degree phase difference between the signal output of the cancellation cable $L_3$ and the signal output of the resonant chamber RC may be obtained by the provision of a termination 14 at the input end of that cable adapted for slidable movement on the outer conductor 2 of the main coaxial line $L_1$ to provide a given amount of longitudinal movement in either direction from a given point of the probe 12 within the line $L_1$, so as to enable its positioning at a proper distance from the branching point B. Tests of a radar arrangement, similar to that illustrated in Fig. 1, in combination with the cancellation arrangement shown in that figure indicated that during signal transmitting intervals the reduction in high power leakage through the resonant chamber at a frequency of 2745 megacycles was in the order of 16 decibels.

Cancellation of the high power leakage by using a cancellation path excited from a point removed longitudinally along the main coaxial line $L_1$ requires that the point of connection B of the resonant chamber RC of the transmit-receive switch to that line be adjusted along the line for the optimum operating point. The cancellation scheme illustrated in Fig. 2 avoids this requirement by the selection of a pick-up point for the cancellation voltage adjacent to and symmetrically located with respect to the center point of the input iris 7 for the resonant chamber RC. Instead of employing a probe pick-up as illustrated in Fig. 1, in the arrangement of Fig. 2 a pick-up loop 15 is provided for coupling at this point, so that the cancellation path $L_3$ and the resonant chamber RC are current excited from a common point on the line $L_1$. When employing such a loop, the degree of cancellation is essentially independent of the position of the resonant chamber RC along the main line $L_1$. Also, in the cancellation arrangement of Fig. 2, the required phase and magnitude of the cancellation voltage is respectively accomplished by proper orientation of the input loop 15 and adjustment of the effective length of the cancellation path by means of a telescoping section 16 of the coaxial cable employed for that path.

The modified arrangement of the invention illustrated in Fig. 3 differs from that of Fig. 2 merely in that the mechanical design of the resonant chamber RC has been simplified by the elimination of the tuning plunger 5 and the substitution of the metal tuning screws or plugs 17 and 18 extending through properly located opposite points in the side walls of the chamber, the tuning of the chamber depending upon the degree of penetration of these screws. Thus, a double mode, plug-tuned resonant chamber adapted to transmit a band of frequencies is obtained.

Figs. 4 to 6 show various views of a portion of a radar system employing a resonant chamber-gas discharge tube type of transmit-receive switch, and an associated high power leakage cancellation arrangement in accordance with the invention which has been found to be particularly efficient. The transmit-receive switch includes a sector of pipe 4 having two centrally located apertures 19a and 19b, adapted to slide along the portion containing longitudinal slot 3 of the outer concentric conductor 2 of the main coaxial line $L_1$ which connects the signal transmitter or pulse generator T to the common transmitting and receiving antenna A.

Mounted on the pipe sector 4 symmetrically with respect to its two apertures 19a and 19b is a metal box or housing 20 containing adjacent to each other two identical hollow metal-walled chambers or cavities, RC and CC, of rectangular cross-section with their longitudinal axes perpendicular to the longitudinal axis of the main coaxial line $L_1$. The chambers RC and CC are of the general "double mode" plug-tuned type illustrated in Fig. 3, each chamber including two tuning plugs 21 and 22 extending through the side walls of the chamber at respectively opposite points, which are utilized for adjusting the resonant frequency of the chamber to the desired value; an individual gas discharge tube 23 the discharge path of which is connected in shunt with the chamber at a high impedance point; individual input irises provided by the apertures 19a and 19b, respectively in the pipe sector 4, which are so located as to respectively connect the interior of the chamber RC and the interior of chamber CC to the interior of the main coaxial line $L_1$ through the longitudinal slot 3 in its outer conductor 2; and an individual output loop 26, 27 in the end of each chamber opposite the input iris. The auxiliary box-like projections 28, 29 attached to opposite outer walls of the main housing 20 serve to form a protective housing for the gas tubes 23 and may be unscrewed to allow the tubes to be removed or replaced.

The gas-filled tube 23 may be of any suitable type. The particular gas-filled discharge tube illustrated consists of an outer glass vessel enclosing an atmosphere of gas at low pressure, a pair of main electrodes 30 and 31 within the vessel, having axially aligned frusto-conical portions mounted with their smaller ends in juxtaposition and defining a spark-gap, and an auxiliary electrode 32, termed an ignitor or keep alive electrode, formed by a rod extending partly within the frusto-conical portion of one of the main electrodes. During operation of the tube 23, the auxiliary electrode 32 is maintained at a fixed negative potential with respect to the main electrodes 30 and 31 by an associated power source (not shown) whereby a glow discharge is maintained between the auxiliary electrode and the adjacent frusto-conical portion, this discharge being substantially confined to the region outside of the high frequency field region between the main electrodes. The function of this glow discharge is to reduce the time or voltage required for ionization in the tube. This in turn reduces the leakage power through the chamber RC or CC at the initiation of the firing of the associated gas tube. In each chamber RC and CC, the main electrodes 30 and 31 are connected to opposite chamber walls at a high impedance point (electrical center) of the chamber, effectively in shunt with the input iris couplings 19a and 19b, respectively. The tube constants are selected so that the maximum voltage of the resonant frequency built up across the associated gas tube 23 by the energy of each outgoing high power signal pulse diverted into the chamber through its input iris will cause the gas in the tube to break down and a discharge to take place across its spark-gap so as to provide a low impedance shunt across that chamber. With the tube constants so selected, the relatively low voltage of the portion of each incoming signal pulse diverted into the chamber through its input iris will be ineffective to cause discharge of the tube 23, and the chambers RC and CC will be maintained in their normal tuned or untuned conditions respectively, determined by the adjustment of their tuning plugs 21, 22, with respect to the signal frequency so as to allow or prevent, respectively, efficient transmission of the applied signal pulses to the individual output loop 26 or 27 of the resonant chamber.

The individual output coupling loops 26 and 27 of the resonant chambers RC and CC, respectively, having respectively reversed wiring arrangements illustrated in Fig. 6 to be described later, are connected through a T junction 33 to the inner and outer conductors of a section of coaxial line $L_4$ including the quarter-wavelength line 34 operating as an impedance matching transformer. The section of coaxial line $L_4$ feeds into the signal receiver R indicated as being of the superheterodyne or double detection type. In that receiver, the incoming signal energy received over the line $L_4$ is combined in the first detector stage 35 comprising a crystal converter, with beating oscillations of suitable frequency supplied over a branching coaxial line $L_5$ coupled to the coaxial line $L_4$ in the input of the detector 35 by the adjustable telescopic section 36, to beat the signals down to an intermediate frequency which may be amplified in an intermediate frequency amplifier, detected in a second detector stage and supplied to a suitable signal recorder or signal receiver as in the usual superheterodyne receiver.

One of the chambers RC and CC with its associated shunting gas discharge tube 23 is utilized to perform the function provided by the path $L_3$ in the system of Fig. 3, that is, to provide effective cancellation of the high power leakage through the other chamber during signal transmitting intervals while allowing the relatively low power incoming signal energy to be transmitted through the latter chamber to the signal receiver during signal receiving intervals with little loss. This is accomplished by the provision of means for making the wave outputs of the two chambers RC and CC equal during signal transmitting intervals when equal portions of the outgoing signal energy are applied to the inputs of these chambers from the common branching point on the main coaxial line $L_1$ and for combining these equal outputs in phase opposition so as to effectively prevent any energy from being transmitted to the receiver R during these intervals; and by making the attenuation of one of the chambers, say, CC, utilized for the cancellation chamber during signal transmitting intervals of a value such that during signal receiving intervals when equal portions of the low level incoming signal power are applied to the two chambers from the common branching point on the main line, the signal output from the cancellation chamber will be substantially zero and thus there will be no cancellation of any of the low power signal energy transmitted through the other resonant chamber RC which remains tuned to the signal frequency. The latter is attained by proper adjustment of the tuning plugs 21, 22 of the cancellation chamber CC so that it is normally detuned from the signal frequency.

Cancellation of the high power leakage is accomplished when the tuning plugs of the cancellation chamber are adjusted to give the proper current amplitude in the cancellation loop. The proper phase relation of the currents in the two output loops for cancellation is obtained by complementary orientation of the output loops in the two chambers. As seen in the wiring schematic of Fig. 6, to accomplish the latter result, the conductor forming the output loop 26 in the chamber RC extends from the T junction point 33 through a hole near one chamber wall into chamber RC in which it is bent back on itself and fastened to a ground point 37 on the chamber wall with a developed lead length of one-quarter wavelength, and the conductor forming the output loop 27 in the resonant cavity CC extends from the junction T 33 through a hole in one wall of the chamber CC into that chamber in which it is bent back on itself in the opposite direction to that used for the first output loop, and is fastened to a ground point 38 on the chamber wall also with a developed lead length of one-quarter wavelength. In other words, the output coupling loops 26 and 27 have radial symmetry about the T junction point 33. The opposition of direction of the loop conductors establishes the necessary 180-degree phase reversal for cancellation. The dimension of one-quarter wavelength for the developed length of each output loop conductor from the T junction point 33 to its point of anchorage on a chamber wall provides the necessary high shunt impedance at the junction from one circuit to the other.

A "dummy" tube, such as a continuous post between the chamber walls having an effective impedance equal to that of the gas tube used in the main resonant chamber, in the undischarged condition could be used in the cancellation chamber of the arrangement of Figs. 4 to 6, in the place of the gas tube in that chamber, at a position corresponding to that of the active tube in the other resonant chamber, but it has been found that the use of active gas tubes in both chambers gave better cancellation of the high power leakage components particularly when a "keep-alive" voltage is applied to both tubes, which may be attributed to the fact that the gas leakage component as well as the direct leakage component is reduced. Furthermore, the amount of "spike" at the leading edge of the pulse could also be reduced with the two-tube arrangement.

Tests of a radar system employing a resonant chamber gas-discharge tube transmit-receive switching arrangement of the twin chamber type illustrated in Figs. 4 to 6, in combination with a coaxial line delivering about 300 kilowatts of power to the common transmitting and receiving antenna show that with addition of a properly adjusted cancellation path of the latter arrangement a reduction of the high power leakage through the switching arrangement during signal transmitting intervals in the order of about 36 decibels can be obtained. Without the use of this cancellation scheme, it was found that the crystal detectors used in the signal receiver would be substantially impaired by the high power leakage.

Various modifications of the arrangements of the invention illustrated and described which are within the spirit and scope of the invention will occur to persons skilled in the art.

What is claimed is:

1. In combination, a common line for transmitting at different times high power alternating current signals and relatively low power alternating current signals, a signal receiver, a coupling device normally resonant to the frequency of said low power and high power signals, connecting said receiver to said line, control means connected to said line through a portion of said coupling device, operatively responsive to the energy of the high power signals applied thereto through said device to detune the latter so that the amount of high power signaling energy reaching said receiver is appreciably reduced, said control means being unresponsive to the relatively low power signals applied thereto through said device so that said device is maintained tuned to transmit said low power signals efficiently to said receiver and auxiliary means to provide further protection of said receiver from said high power signals comprising means to continuously abstract sample energy portions of the transmitted signals from said line and means to combine the high power signal components only of the abstracted sample energy portions with the signal output of said coupling device in such manner as to substantially suppress the high power signal leakage through said coupling device when the latter is detuned by operation of the associated control device in response to applied high power signals.

2. The combination of claim 1, in which said auxiliary means comprises a signal by-passing circuit connecting the input and output of said coupling device, means in said by-passing circuit for making the amplitude and phase of the high power signal output thereof such that it effectively balances out the high power signal leakage through said coupling device when the latter is detuned, and other means to make the attenuation of said by-passing circuit sufficiently large to prevent transmission of any substantial amount of the low power signaling energy therethrough to the output of said coupling device.

3. The combination of claim 1, in which said auxiliary means comprises an additional transmission path connecting said line to the output of said coupling device, the effective length of said path and its poling with respect to the input and output of said coupling device being such that when said coupling device is detuned by operation of said control means in response to high power signal energy applied from said line, the amplitude and phase of the high power signal energy output of said additional transmission path is such that the latter effectively cancels out the high power signal leakage through said coupling device.

4. The combination of claim 1, in which said coupling device comprises a hollow wave guide resonant chamber coupling said receiver to said line at a given point and adjustable tuning means therefor, said energy-responsive control means comprises a gas discharge device connected across said chamber, adapted to discharge to provide a low impedance detuning shunt thereacross in response to the applied voltage produced by the high power signal energy entering said chamber from said line, and to remain undischarged to maintain the chamber tuned in response to the relatively lower applied voltage produced by the low power signal energy entering said chamber from said line, said auxiliary means comprises a second coupling device including a second resonant chamber identical with the first resonant chamber, and an associated detuning gas discharge device and adjustable tuning means, respectively, identical with the detuning gas discharge device and the tuning means associated with said first chamber, coupling said signal receiver to said line at said given point, the tuning means associated with said first and second resonant chambers being respectively adjusted so that in the absence of applied high power signals said first chamber is tuned to the frequency of said signals and said second chamber is detuned from that frequency, and so that when high power signals are applied to the inputs of both chambers the output voltage of said second chamber is equal to that of said first chamber when the latter is detuned by the consequent discharge of the associated discharge device, and the outputs of the two chambers with respect to the input of said receiver are respectively phased so that in the latter condition the high power leakage components through said first chamber are effectively balanced out.

5. In combination, a line transmitting high power and low power alternating current signals at different times, a signal receiver, a branch transmission circuit connecting said receiver to said line, including a hollow wave guide chamber resonant to the frequency of said high power and low power signals, a discharge device connected across said chamber, adapted to discharge in response to the applied high voltage of the high power signals entering said chamber from said line to produce a low impedance shunt across the chamber thereby detuning the latter so as to appreciably reduce the high power signal input to said receiver and adapted to remain undischarged in response to the relatively lower applied voltage of the low power signals entering the chamber to maintain the tuning of the latter so that it transmits the latter signals efficiently to said receiver, and means to substantially suppress the high power signal leakage through said chamber when it is detuned comprising a signal by-pass circuit connected around said chamber, means in said by-pass circuit for making the amplitude and phase of the high power signal output thereof when said chamber is detuned by applied high power signals, respectively equal and opposite to that of said chamber, and other means to prevent suppression by said by-pass circuit of the low power signals transmitted through said chamber.

6. The combination of claim 5, in which said other means comprises means for making the attenuation of said by-pass circuit equal to that of said chamber when it is detuned by the discharge of said discharge device.

7. In combination, a source of low power and high power electric signals at respectively different times, a signal receiver, a hollow wave guide chamber resonant to the frequency of said low and high power signals, having its input electrically coupled to said source and its output electrically coupled to said receiver, a discharge device connected across said chamber, adapted to discharge in response to the high voltage applied thereto by the high power signals entering said chamber thereby providing a low impedance shunt thereacross which detunes the chamber so as to reduce the amount of high power signal energy supplied to said receiver, and adapted to remain in the undischarged condition in response to the relatively lower voltage applied thereto by the low power signals entering said chamber thereby maintaining the chamber tuned to transmit the latter signals efficiently to said receiver, auxiliary means for abstracting from said source and separately supplying to the output of said chamber energy samples of the high power signals applied to the input of said chamber, in proper magnitude and phase with respect to the signal output thereof as to effectively cancel the high power leakage through said chamber, and other means to prevent said auxiliary means from causing cancellation of low power signals transmitted through said chamber during low power signal transmitting intervals.

8. The combination of claim 7, in which said auxiliary means comprises a circuit for by-passing a portion of the energy of the high power signals from said source around said chamber to the output thereof, the effective length of said by-passing circuit being selected and the poling thereof with respect to said chamber being adjusted to provide the required magnitude and phase of the by-passed signal components at the output of said chamber for high power leakage cancellation, and said other means comprises means for making the attenuation of said by-passing circuit equal to that of said chamber when it is detuned by the discharge of said discharge device.

9. The combination of claim 7, in which said source comprises a main line having a tubular outer conductor, and means to transmit low and high power alternating current signals at respectively different times in opposite directions over said line, said resonant chamber includes metal tuning plugs adapted for insertion therein to different distances to adjust the tuning of the chamber over a desired frequency range, said chamber being electrically coupled at its input to said main line at a given intermediate point through an iris opening in its outer tubular conductor and being electrically coupled at its output to said signal receiver through an output pick-up loop within said chamber, said auxiliary means comprises a second resonant chamber identical with the first chamber also coupled at its input to said main line at said intermediate point through said iris opening in said outer tubular conductor, and being connected at its output through an individual output loop to the output loop of the first resonant chamber through a T junction, the individual tuning plugs of said second resonant chamber being adjusted to give said proper magnitude of the high power energy samples in its output loop, and the output loops of the two chambers being oriented in complementary relation so as to provide said proper phase of the high power energy samples in the output loop of said second chamber for cancellation of high power leakage through the first resonant chamber, said other means comprising an adjustment of the tuning plugs of said second chamber so that the latter is normally detuned from the frequency of said low power signals.

10. In combination with a duplex signal transmission system including at a terminal thereof a common line having an outer tubular conductor, for transmitting outgoing alternating current signals of high power in one direction thereover and incoming alternating current signals of the same frequency and of relatively low power in the opposite direction thereover and a signal receiver for said incoming low power signals, a coupling and switching device comprising two identical resonant chambers, having their inputs coupled to said line at a common point through an iris opening in its outer conductor, and their outputs connected to said signal receiver through a T junction of individual output loops within the respective chambers, adjustable tuning means for each chamber and a discharge device connected across each chamber at a high impedance point, adapted to discharge to provide a low impedance shunt across the chamber effectively detuning it in response to a high resonant voltage such as would be applied by the high power signals entering the chamber through said iris opening and adapted to remain in the undischarged condition in response to the relatively lower resonant voltage which would be applied thereto by the low power signals entering the chamber through said iris opening, said individual output loops being relatively disposed so that they have radial symmetry about said T junction thus providing a 180-degree phase difference in the outputs of the two chambers, the tuning means of one chamber being normally adjusted to make that chamber resonant to the frequency of said low and high power signals, the tuning means of the other chamber being normally adjusted so that the latter chamber is detuned from said frequency of said low and high power signals to provide a signal output equal and opposite to that of the detuned first chamber when the high power signals are applied to the inputs of the two chambers and substantially no output when low power signals are applied to the inputs of the two chambers at said common point, so that high power signal leakage through said one chamber is substantially cancelled during signal transmitting intervals and the low power signals are transmitted efficiently to said signal receiver during signal receiving intervals.

11. The combination of claim 10, in which the radial symmetry of said two output loops about said T junction is provided by an arrangement of their respective loop conductors so that they traverse the respective chambers in respectively opposite directions with a developed conductor length of one-quarter wavelength from the T junction.

CHARLES F. P. ROSE.